US012237133B2

(12) United States Patent
Wang et al.

(10) Patent No.: US 12,237,133 B2
(45) Date of Patent: Feb. 25, 2025

(54) TRIP OVERLOAD PROTECTION SWITCH WITH REVERSE RESTART SWITCHING STRUCTURE

(71) Applicants: Yi-Hsiang Wang, Taoyuan (TW); I-Ying Wang, Taoyuan (TW)

(72) Inventors: Yi-Hsiang Wang, Taoyuan (TW); I-Ying Wang, Taoyuan (TW)

( * ) Notice: Subject to any disclaimer, the term of this patent is extended or adjusted under 35 U.S.C. 154(b) by 0 days.

(21) Appl. No.: 18/477,216

(22) Filed: Sep. 28, 2023

(65) Prior Publication Data

US 2024/0112874 A1 Apr. 4, 2024

(30) Foreign Application Priority Data

Oct. 3, 2022 (TW) ................................. 111137549

(51) Int. Cl.
*H01H 73/14* (2006.01)
*H01H 21/20* (2006.01)
*H01H 71/50* (2006.01)

(52) U.S. Cl.
CPC ............ *H01H 73/14* (2013.01); *H01H 21/20* (2013.01); *H01H 71/504* (2013.01)

(58) Field of Classification Search
CPC ........ H01H 21/20; H01H 37/60; H01H 37/32; H01H 71/504; H01H 73/14
USPC .......................................................... 361/102
See application file for complete search history.

(56) References Cited

U.S. PATENT DOCUMENTS 5,694,106 A * 12/1997 Wang ................ H01L 21/67109 337/72
2017/0148601 A1* 5/2017 Wang ................... H01H 9/0271
2017/0148602 A1* 5/2017 Wang ................... H01H 37/761
2019/0066887 A1* 2/2019 Wang ..................... H02H 9/041

* cited by examiner

*Primary Examiner* — Kevin J Comber
(74) *Attorney, Agent, or Firm* — Birch, Stewart, Kolasch & Birch, LLP

(57) ABSTRACT

A overload protection switch with a reverse restart switching structure that has a seesaw lampshade provided with a protruding block which extending downward from the outside of the seesaw lampshade to ensure that the seesaw lampshade and the moving rod are accurately positioned in the ON and OFF positions in the housing to form a three-stage switching type with bidirectional positioning and forms an overload protection switch that can continuously maintain sufficient insulation distance and does not reduce the insulation distance due to fatigue decay of the binary alloy conductive plate.

9 Claims, 19 Drawing Sheets

OFF

TRIP OVERLOAD PROTECTION SWITCH WITH REVERSE RESTART SWITCHING STRUCTURE

BACKGROUND OF THE INVENTION

1. Field of the Invention

The present invention relates to a trip overload protection switch with reverse restart switching structure, particularly to one that has a seesaw lampshade provided with a protruding block which extending downward from the outside of the seesaw lampshade to ensure that the seesaw lampshade and the moving rod are accurately positioned in the ON and OFF positions in the housing to form a three-stage switching type with bidirectional positioning and forms an overload protection switch that can continuously maintain sufficient insulation distance and does not reduce the insulation distance due to fatigue decay of the binary alloy conductive plate.

2. Description of the Related Art

Low-voltage circuit breaker, Europe and America call molded-case circuit breaker (MCCB) (UL489) is a three-stage switching type low-voltage over-current protection circuit breaker. Compared with miniature circuit breaker (MCB) (UL1077), molded-case circuit breaker has a larger rated current and breaking capacity, another product with leakage protection is classified as electricity leakage circuit breaker (ELCB), and for products with relatively small capacity, it is called MCB Or ELB. Usually, MCCB and ELCB circuit breakers are used for large breaking capacity, commonly formed as a three-stage switching type. MCB and ELB are used for small interruption capacity, their function is mainly to protect household equipment and circuit safety. When an overload or short circuit accident occurs, it will trip and isolate the power supply. If it is ELCB or ELB, it has leakage protection function. Circuit breaker is the main isolating switch for protecting equipment and circuit safety in the world, and it is also the most common product in the world.

FIGS. 1A and 1B disclose a conventional overcurrent protection switch 10 comprises a housing 11 with a lampshade 12 on the top, a first terminal 12*a*, a second terminal 12*b*, a third terminal 12*c* separately arranged at the bottom for providing power for neon lamp 15. The first terminal 12*a* has a bimetal plate 13 and a first contact 131; the second terminal 12*b* has a second contact 121 corresponding to the first contact 131. The moving element 14 has one end linking the bottom of the lampshade 12 and the other linking the moving terminal of the bimetal plate 13, whereby the pressing of the lampshade 12 actuates the first contact 131 connecting to the second contact 121 and therefore turns on the device; while overcurrent occurs, the bimetal plate 13 deforms due to high degree of temperature and disconnects the first and second contact 131, 121, turning off the device so as to form an overcurrent protection switch 10. Such structure can be found in Taiwan patent applications No. 540811, 367091, 320335, 262168, and 208384.

However, above mentioned conventional overcurrent protection switch 10 does not have the multiple step fool-proof design that molded-case circuit breaker has, due to the use of a cyclic tripping structure, when the lampshade 12 is pressed or stuck, the bimetal plate 13 is repeatedly connected and disconnected (ON←→OFF), repeated overloads resulting in loss of overload protection function, so the service life and use safety need to be improved.

U.S. Pat. No. 11,501,941, the prior patent of the inventor, an overload protection switch with reverse restart switching structure, particularly to one that has a molded-case circuit breaker which adding a lampshade parallel stagnation position for overload indication, and when resetting, needs to press back to the RESET for reconfirmation; due to the stagnation position and reverse restart structure, it can avoid repeating the reset action, preventing the reduction of the life of the overload protection switch and repeated exposure or the misjudgment and then resetting of electrical products that have been overloaded and tripped and then overload again then results in causing dangerous; also, the invention has a unidirectional three-stage switching panel, the lampshade can be completely tripped even when the lampshade is suppressed, and prevent the danger of repeated tripping during overload. However, this patent has two flaws, referring to FIGS. 2A-3B, the first terminal 40 is connected to a binary alloy conductive plate 41, the inner side of the movable end 411 of the binary alloy conductive plate 41 extends a spring leaf 42 the movable end 411, above the movable end 411 having a first connecting point 421, and the second terminal 50 having a second connecting point 511 on the surface of an upper section 51 thereof corresponding to the first connecting point 421; Wherein FIGS. 2A and 3A, the movable end 411 of the binary alloy conductive plate 41 is curved in down concave arc shape 411*b*, for making the spring leaf 42 to bounce upward; Wherein FIGS. 2B and 3B, the movable end 411 of the binary alloy conductive plate 41 is curved in up concave arc shape 411*a*, for making the spring leaf 42 to bounce downward; Since the binary alloy conductive plate 41 was previously manufactured by the inventor with the invention US patent No. 2022/0139652 A1"MANUFACTURE METHOD OF A CONCAVE DISC-SHAPED STRUCTURE OF BIMETAL STRIP". However, it has been found that the dish-shaped condensed structure of the above-mentioned binary alloy conductive plate 41 can indeed improve the accuracy of over-current tripping and improve the condensation yield rate. However, when the dish-shaped condensed structure causes the spring leaf 42 to bounce downward, because it does not position as the first connecting point 421 contacting the second connecting point 511 when it bounces upward, so that when the spring leaf 42 bounces downward, as shown by the dotted line in FIG. 3B, it will has excessive bounce, which will destroy its internal stress structure with the number of switching times, leading to a reduction in its service life. Therefore, it is a type of binary alloy conductive plate that fatigue decay with the number of operations.

Furthermore, the elastic leaf 70 includes a main body 71, which is combined with the second terminal 50 in a riveting method 711, and an elastic arc contact end 72 arranged above the main body 71, and with the elastic arc contact end 72 is placed on the outside of an against sheet 322. however, the against sheet 322 is merely an extension plane and has no positioning surface, so it can only ensure that the seesaw lampshade 32 and the moving rod 33 can be accurately positioned in the ON position in only one direction in the housing 31, resulting in having a gap (S) between the brake plate 332 at the bottom of the moving rod 33 and the movable end 411(411*a*) of the binary alloy conductive plate 41, so the moving rod 33 on the right side cannot make the brake plate 332 reach the high point location, so when the spring leaf 42 bounces downward, the distance (D) between the first connecting point 421 and the second connecting point 511 cannot be pulled away, making the binary alloy conductive plate cannot maintain the specified insulation distance when fatigue decays, and the operating habits of the unidirectional three-stage switching panel are different from the habits of the MCCB with bidirectional three-stage switching panel, which may cause misjudgment of positioning point drift occurs.

In addition, when the first connecting point 421 and the second connecting point 511 in the above-disclosed patent are in contacted and separated from the trip, producing the time-delay electric arc that cannot disappear by itself, and it is scattered around to form a diffuse carbon ash layer, and then affects the dielectric test results; furthermore, it also makes it impossible to use environmentally friendly materials with too much carbon ash for manufacturing the first and second connecting point 421, 511.

SUMMARY OF THE INVENTION

A primary object of the present invention is to provide a trip overload protection switch with reverse restart switching structure that that has a seesaw lampshade provided with a protruding block which extending downward from the outside of the seesaw lampshade to ensure that the seesaw lampshade and the moving rod are accurately positioned in the ON and OFF positions in the housing, making the binary alloy conductive plate can be fully separated, and can positioning at the OFF position by bidirectional three-stage switching panel, and can maintain the insulation distance and avoid fatigue decays.

Another object of the present invention is to provide a trip overload protection switch with reverse restart switching structure that can avoid excessive bounce deformation, suppresses vibration of the spring leaf and avoid hairline crack by adding a vibration reduction plate.

Another object of the present invention is to provide a trip overload protection switch with reverse restart switching structure that accelerates the separation time of the contact points and avoids unnecessary vibration of the binary alloy conductive plate during switching which may sparkle, so as to increase the service life and form a safe insulation distance overload protection switch.

To achieve the objects mentioned above, the present invention comprises a housing, having a top opening and a side opening, the top opening has a seesaw lampshade, and a first terminal and a second terminal arranged at a bottom section; the first terminal is connected to a binary alloy conductive plate, the binary alloy conductive plate has a spring leaf with a first connecting point, and the second terminal has a second connecting point on a surface of an upper section thereof disposed in correspondence with the first connecting point; a moving rod linking a pivot hole at a bottom of the seesaw lampshade with one end and the binary alloy conductive plate with an opposing end thereof for the first connecting point to contact the second connecting point responsive to the pivot hole being pushed inward, to thereby achieve a conducting state (ON), and the first connecting point disconnecting from the second connecting point responsive to occurrence of a current overload wherein the binary alloy conductive plate deforms due to high temperature, and thereby achieving a nonconducting state (OFF), to thereby form an overcurrent protection switch; wherein: the seesaw lampshade is provided with a protruding block at the other end corresponding to the pivot hole, the protruding block is formed by extending downward from the outside of the seesaw lampshade, having an inclined pressing surface at the upper part and an inclined against surface at the lower part; and an elastic leaf arranged above the second terminal and contacting the outside of the protruding block for providing the seesaw lampshade with an elastic stopping force, whereby when switched to the ON position, the elastic leaf is located on the inclined against surface at the lower part of the protruding block; when switched to the OFF position, the elastic leaf is located on the inclined pressing surface of the protruding block, ensuring that the seesaw lampshade and the moving rod are accurately positioned in the housing, thereby pushing the bottom end of the moving rod upward, causing the movable end of the binary alloy conductive plate pulled upwardly to the highest point and thereby cause the spring leaf to bounce downwardly to the vibration reduction plate position then the distance between the first connecting point and the second connecting point is maximized to ensure the safety of the insulation distance between the two connecting points, so the present invention does not need to reduce the insulation distance due to the fatigue decay of the binary alloy conductive plate Also, wherein the elastic leaf includes a main body and an elastic contact arc end over the main body.

Also, the moving rod includes: a horizontal rod arranged at the upper section of the main body to set through the pivot hole of the seesaw lampshade; two brake plates which extended inward and pushed upward and downward are arranged at the lower section of the moving rod for linking the upward or downward movement of the movable end of the binary alloy conductive plate.

Also, the housing further includes a vibration reduction plate below the binary alloy conductive plate.

Also, wherein the housing further includes a third terminal and a side cover for closing the side opening.

Also, the vibration reduction plate may be provided on the inner edge surface of the side cover or in the housing, and is arranged vertically relatively to the bottom of the binary alloy conductive plate, so that when the binary alloy conductive plate bounces to the OFF position, the spring leaf is stop against downwardly on the vibration reduction plate due to elastic stopping force, preventing excessive bounce deformation and suppressing vibration.

Also, wherein the spring leaf is formed at the movable end of the binary alloy conductive plate and extends from the inner side thereof, and an equidistant space is formed between the left and right inner sides of the binary alloy conductive plate, so that when the current is overloaded, the spring leaf can smoothly bounce and deform on the binary alloy conductive plate; furthermore, at the position relative to the first connecting point in the left and right inner sides of the binary alloy conductive plate, at least one of the inner sides is provided with a lead facing the first connecting point, and the inner end of the lead is in a state of being close to but not in contact with the spring leaf, thereby forming an end receiving the electric arc generated by the first connecting point for making the electric arc leave through the absorption channel formed by the closest lead.

Also, the contact surface of the first connecting point is set in a non-planar shape and has a plurality of grooves, the space between each grooves is 0.2 mm~0.5 mm and presents an oblique surface with a rotational offset angle, the rotational offset angle is 20 to 50 degrees.

Also, the first connecting point is riveted on the spring leaf, then using a small punch-pin to squeeze a rivet post once on the top of the semicircular rivet head to form a down concave arc surface that can fill the perforation gap and avoid indirect conduction then can directly conduct electricity with the inner copper sheet of the binary alloy conductive plate to enhance the stability of the combination and good conductivity, so as to speed up the deformation and tripping in the event of a short circuit.

With the feature above mentioned, the protruding block of the seesaw lampshade has an inclined pressing surface and an inclined against surface which formed on the both sides of the triangular-shaped protruding block to provide the elastic clamping force of the seesaw lampshade, so that when the seesaw lampshade is switched to OFF, the elastic arc contact end of the elastic leaf is located above the inclined pressing surface of the protruding block and pushes downward to the OFF terminal position, and when the seesaw lampshade is switched to ON, the elastic arc contact end of the elastic leaf is located above the below the inclined against surface of the protruding block and pushes upward to the ON terminal position, thereby ensuring that the seesaw lampshade and the moving rod are accurately positioned outside the ON position in the housing, and can also be positioned at the OFF position, so as to achieves the effect of bidirectional three-stage switching panel.

Moreover, when the binary alloy conductive plate bounces to the OFF position, the spring leaf is stop against downwardly on the vibration reduction plate due to elastic stopping force, preventing excessive bounce deformation and suppressing vibration, thereby accelerates the separation time of the contact points and avoids unnecessary vibration of the binary alloy conductive plate during switching which may sparkle, so as to increase the service life and form a safe insulation distance overload protection switch.

DETAILED DESCRIPTION OF THE PREFERRED EMBODIMENT

Figure 1A:
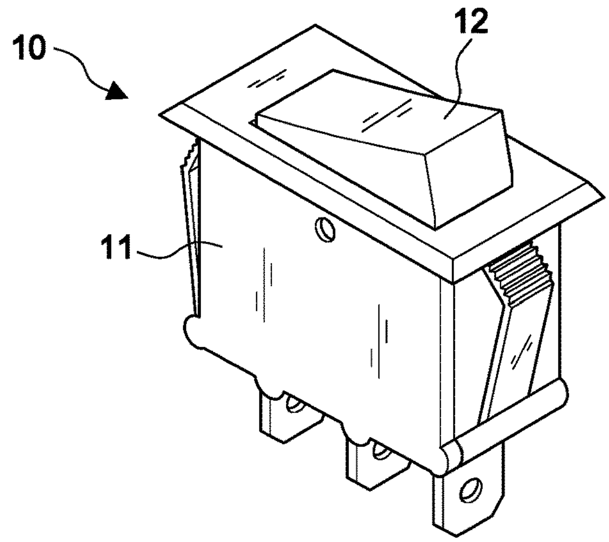
FIG.1A PRIOR ART
FIG. 1A is a perspective view of an overcurrent protection switch according to the prior art.
Figure 1B:
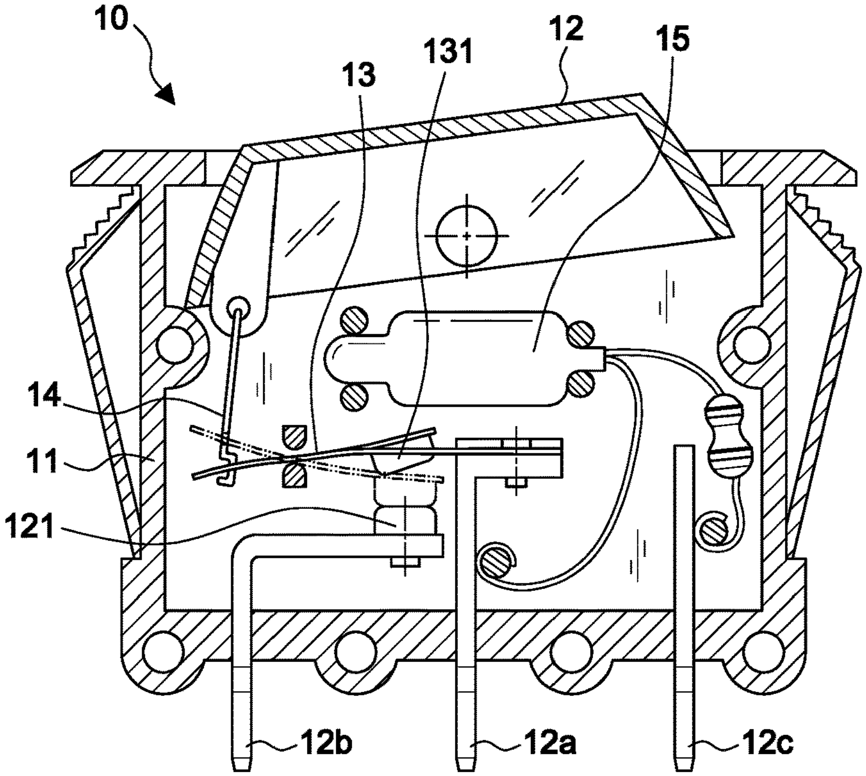
FIG.1B PRIOR ART
FIG. 1B is a section view of an overcurrent protection switch according to the prior art.
Figure 2A:
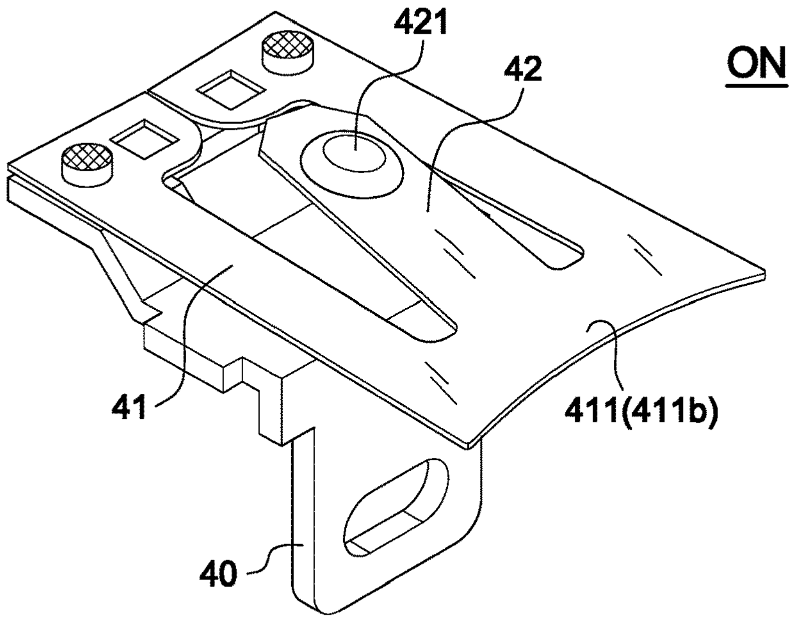
FIG.2A PRIOR ART
FIG. 2A is a perspective view of the patent No. 1747721 when the binary alloy conductive plate is curved downward.
Figure 2B:
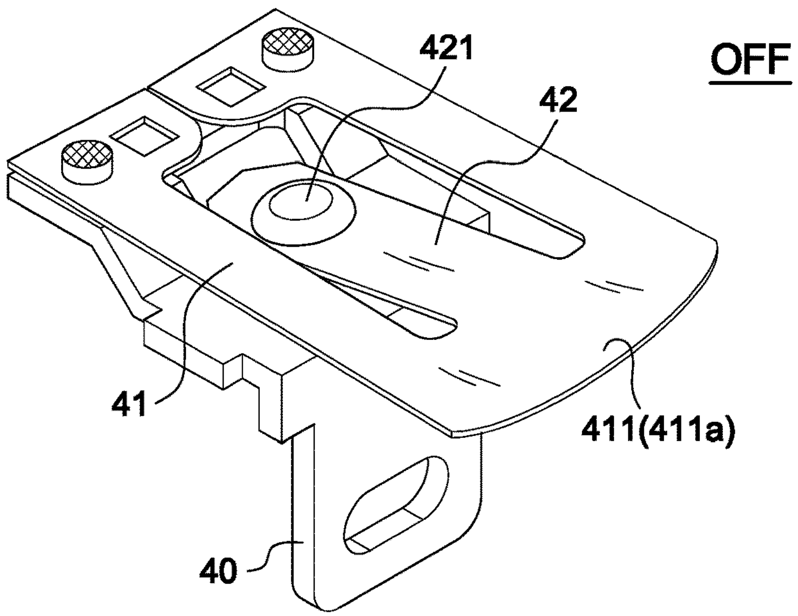
FIG.2B PRIOR ART
FIG. 2B is a perspective view of the patent No. 1747721 when the binary alloy conductive plate is curved upward.
Figure 3A:
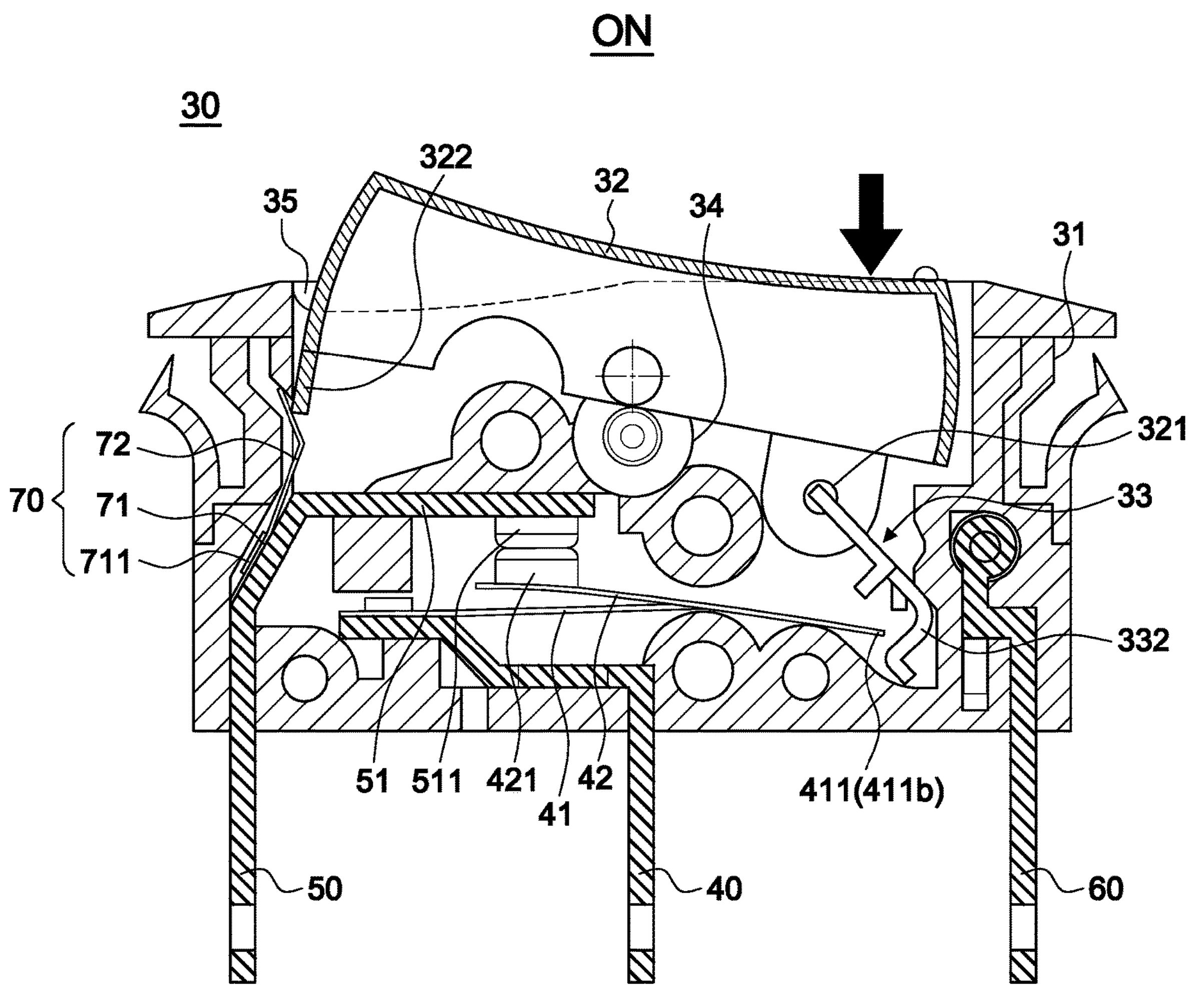
FIG.3A PRIOR ART
FIG. 3A is a side sectional view of the switch of the patent No. 1747721 when the binary alloy conductive plate is curved downward.
Figure 3B:
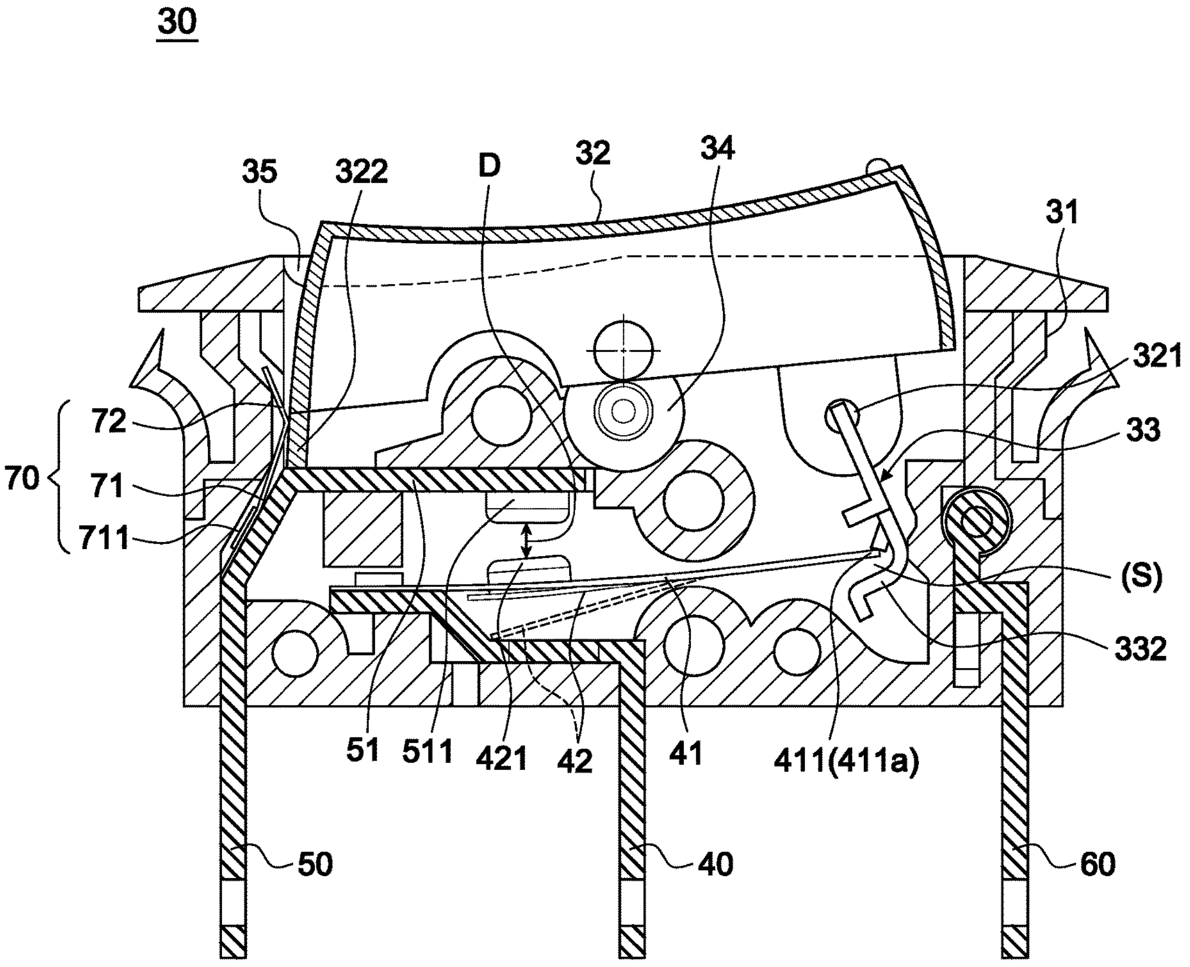
FIG.3B PRIOR ART
FIG. 3B is a side sectional view of the switch of the patent No. 1747721 when the binary alloy conductive plate is curved upward.
Figure 4A:
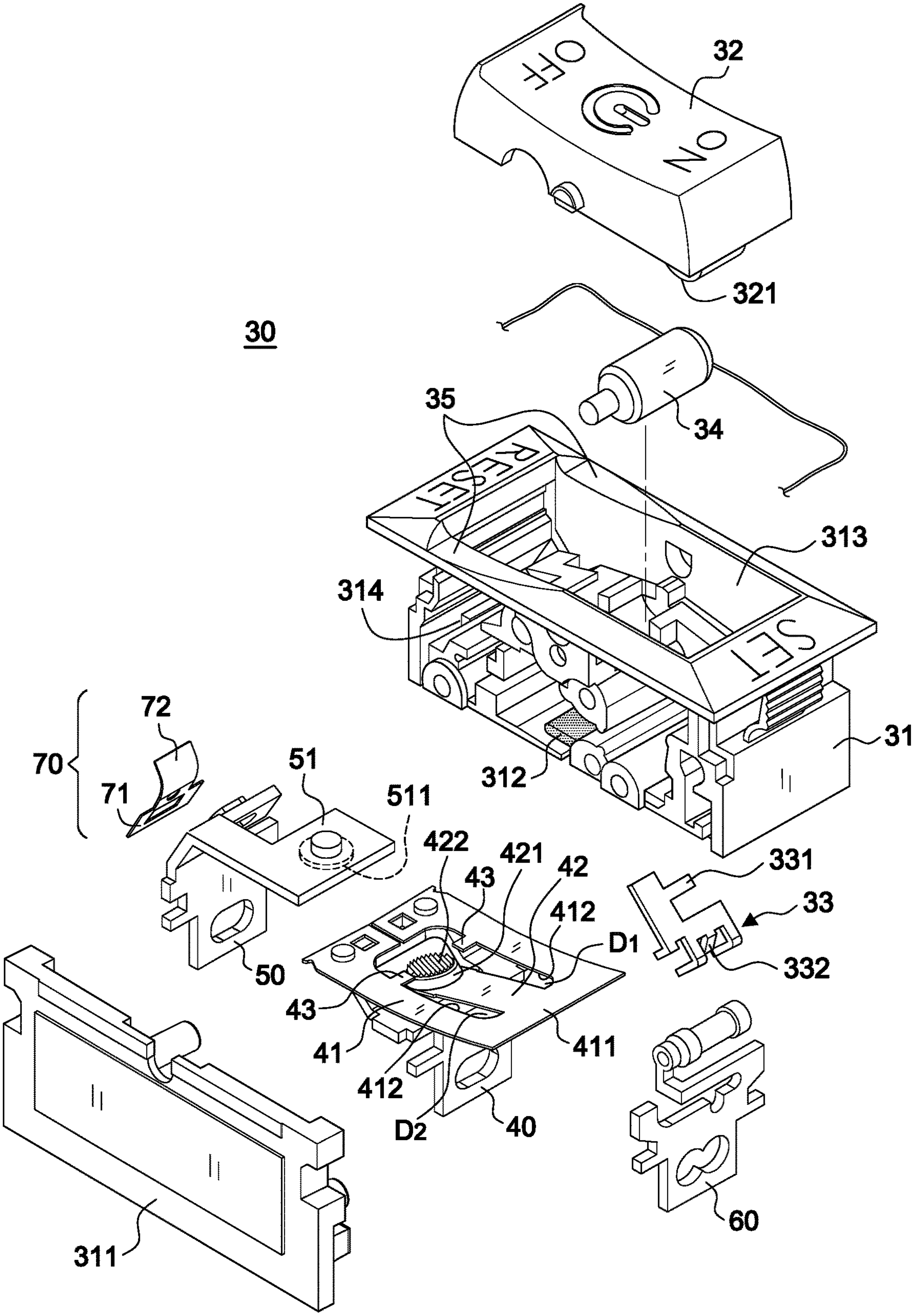
FIG. 4A is an exploded view of the preferred embodiment of the present invention.
Figure 4B:
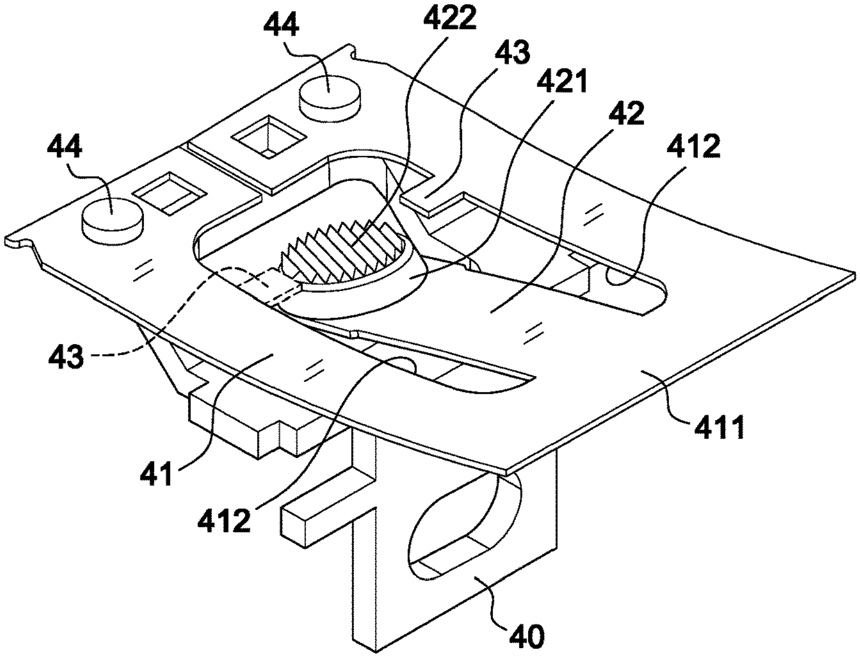
FIG. 4B is an exploded view of the binary alloy conductive plate and the second terminal of the present invention.

Referring to FIGS. 4A-14B, the circuit breaker 30 of the present invention in preferred embodiment includes a housing 31, having a top opening 313 and a side opening 314, the top opening 313 has a seesaw lampshade 32, and the housing 31 further has a side cover 311 for the side opening 314. In this embodiment, below the seesaw lampshade 32 further includes a neon lamp 34; And further has a first terminal 40 and a second terminal 50 arranged at a bottom section; in this embodiment, further includes a third terminal 60, but not limited to this. The first terminal 40 is connected to a binary alloy conductive plate 41, the binary alloy conductive plate 41 has a spring leaf 42 extended from the middle of the inner side of the movable end 411, above the movable end 411 the spring leaf 42 has a first connecting point 421, and the second terminal 50 has a second connecting point 511 on a surface of an upper section 51 thereof disposed in correspondence with the first connecting point 421; As FIG. 4B showing, one end of the movable end 411 which away from the binary alloy conductive plate 41 is coupled to the first terminal 40 with two riveted points 44. In this embodiment, referring to FIGS. 11A-14B, the first connecting point 421 is riveted on the spring leaf 42, then using a small punch-pin to squeeze a rivet post once on the top of the semicircular rivet head to form a down concave arc surface 423 that can fill the perforation gap and avoid indirect conduction then can directly conduct electricity with the inner copper sheet of the binary alloy conductive plate to enhance the stability of the combination and good conductivity, so as to speed up the deformation and tripping in the event of a short circuit.

A moving rod 33 linking up a pivot hole 321 at the bottom of the seesaw lampshade 32 with one end and the binary alloy conductive plate 41 with the other end, in this embodiment, the moving rod 33 includes: a horizontal rod 331 arranged at the upper section 51 of the main body 71 to set through the pivot hole 321 of the seesaw lampshade 32; two brake plates 332 arranged at the lower section of the moving rod 33 and extended inward to push upward and downward for linking the movement of the movable end 411 of the first terminal 40; when the pivot hole 321 is pushed inward, making the first connecting point 421 contact the second connecting point 511 then consequently achieve conducting state(ON, SET end), and when current overload occurs and the binary alloy conductive plate 41, the first connecting point 421 to detach from the second connecting point 511 by deformed due to high temperature, consequently achieve non conducting state(OFF), so as to form an overcurrent protection switch.

The main feature of the present invention is: the inner edge of the housing 31 is provided with a vibration reduction plate 312 perpendicular to the lower part of the binary alloy conductive plate 41, and the vibration reduction plate 312 is arranged below the spring leaf 42 of the binary alloy conductive plate 41, so that when the binary alloy conductive plate 41 forms an open circuit (OFF), the spring leaf 42 is stop against downwardly on the vibration reduction plate 312 due to elastic stopping force, preventing excessive bounce deformation and suppressing vibration.

Figure 9:
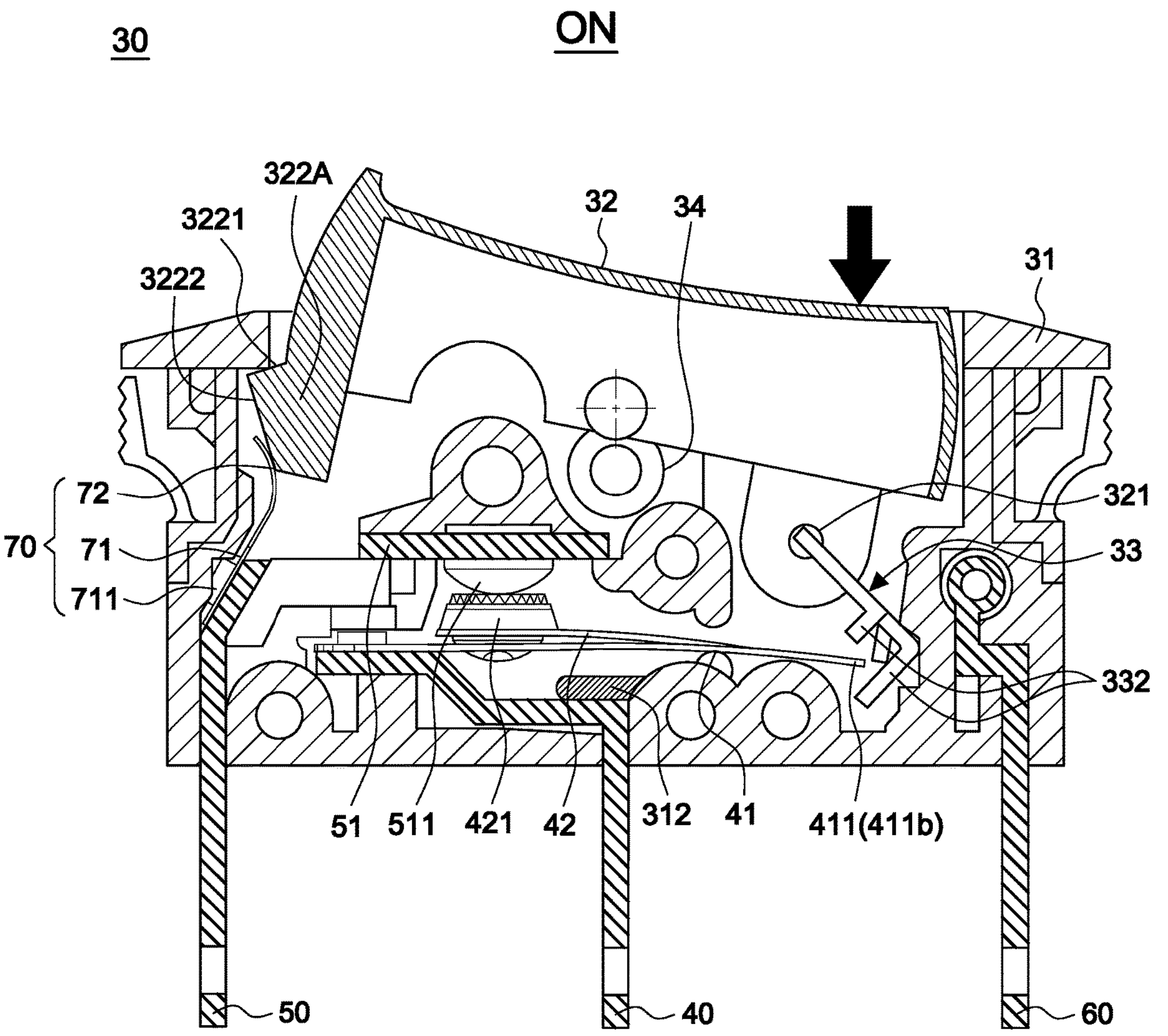
FIG. 9 is a sectional view of the preferred embodiment of the present invention, when is in ON status.

As FIG. 9 showing, when the circuit breaker 30 is ON, the movable end 411 of the binary alloy conductive plate 41 moves downward and is curved in down concave arc shape 411*b*, for making the spring leaf 42 to bounce upward, since the first connecting point 421 of the spring leaf 42 will contact the second connecting point 511, so the present invention can avoid excessive bounce and repeated vibration.

Figure 10:
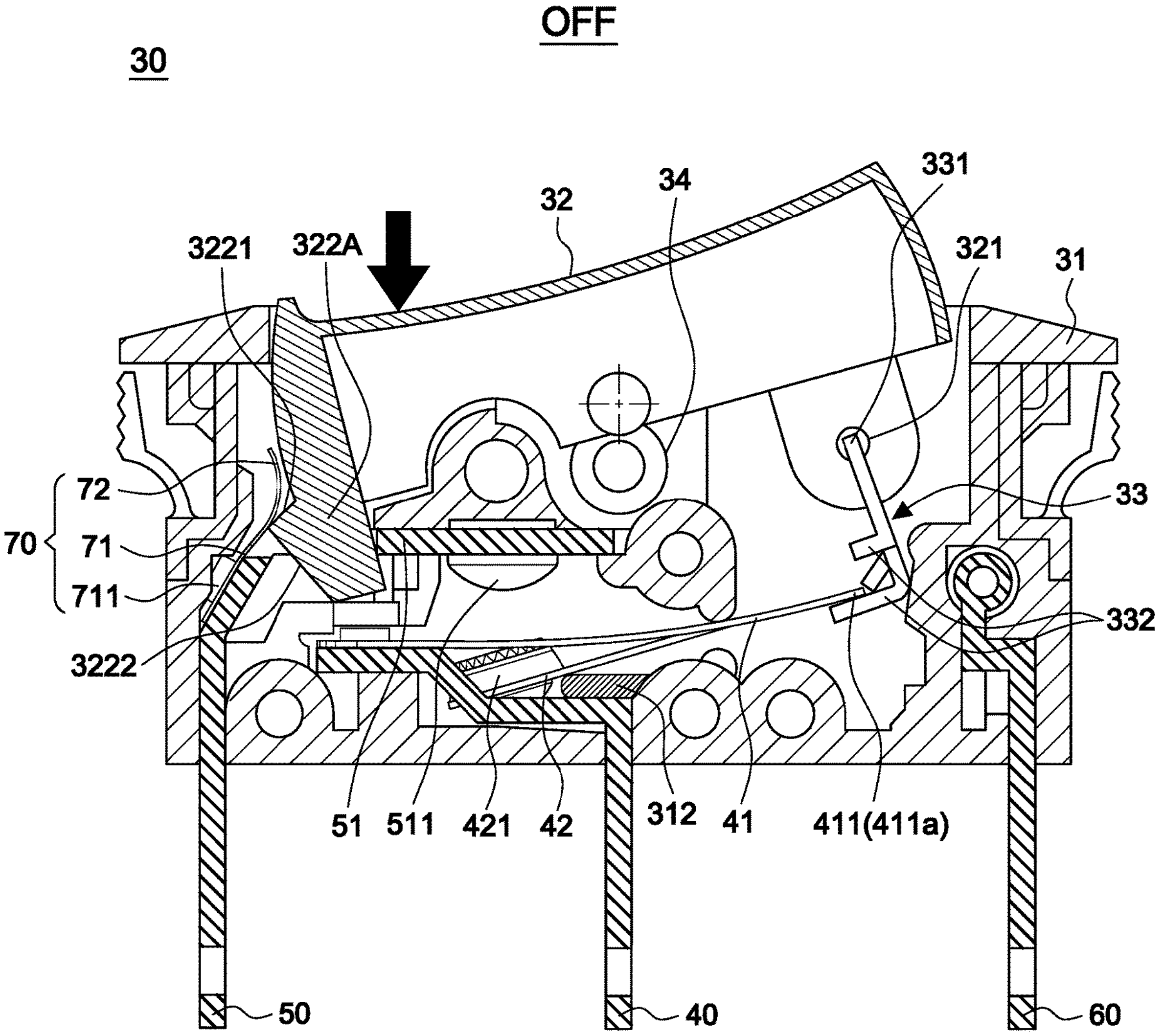
FIG. 10 is a sectional view of the preferred embodiment of the present invention, when is in OFF status.

As showing in FIG. 10, in the present invention, when the spring leaf 42 bounces downward and deforms, it will be blocked by the vibration reduction plate 312, so it will not move downward further. In this way, the position of the vibration reduction plate 312 only need to meet the minimum insulation distance, which will not affect the spring deformation of the binary alloy conductive plate 41, and can avoid excessive bounce and repeated vibration which may destroy internal stress structure and resulting in reducing service life. In this embodiment, the vibration reduction plate 312 is provided in the shape of a bottom plate inside the housing 31, but is not limited to this. It can also be provided in a strip-shaped or columnar shape on the inner edge surface of the side cover 311.

Figure 5A:
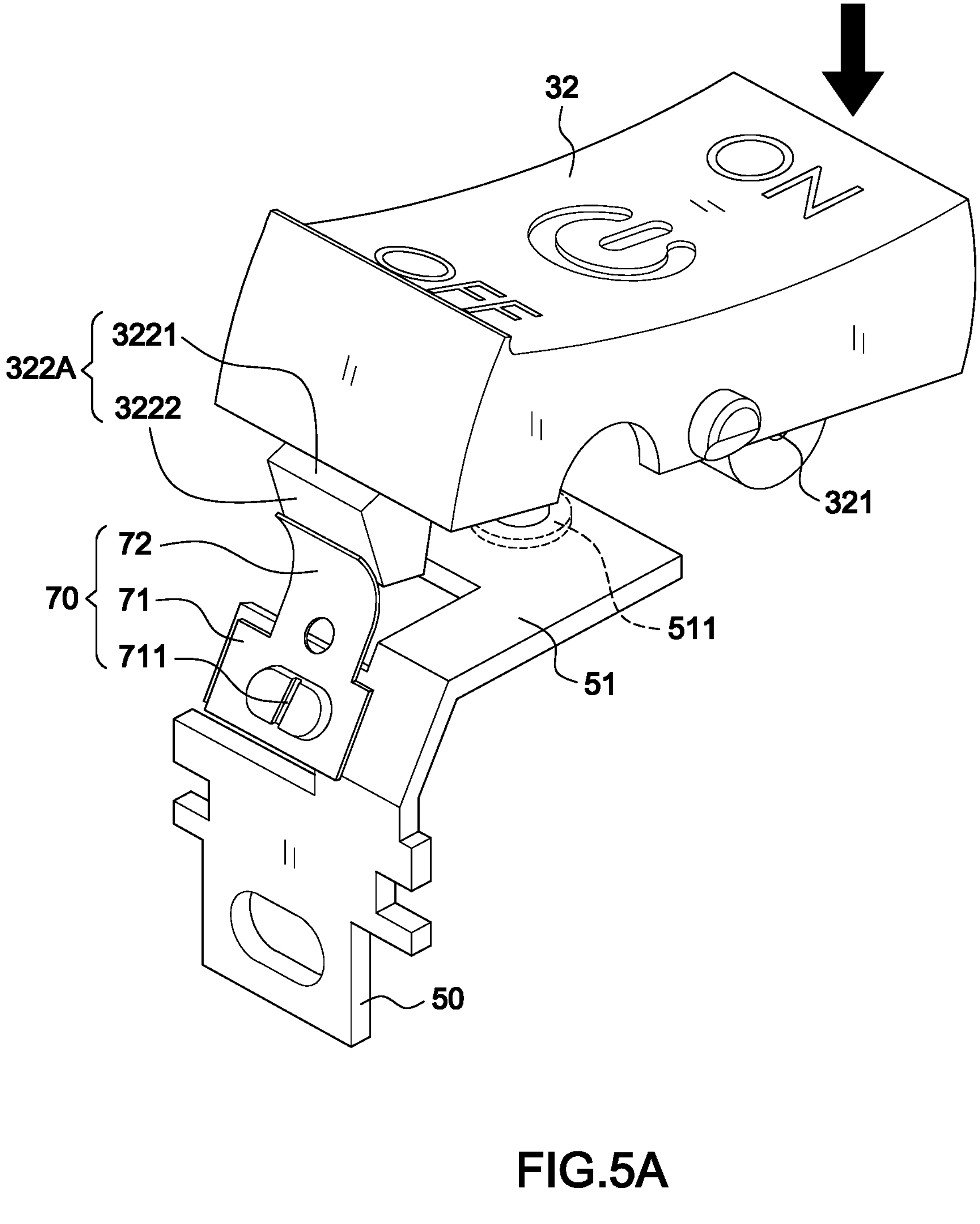
FIG. 5A is a perspective view of the elastic leaf and the seesaw lampshade when the elastic arc contact end is located at the inclined against surface.
Figure 5B:
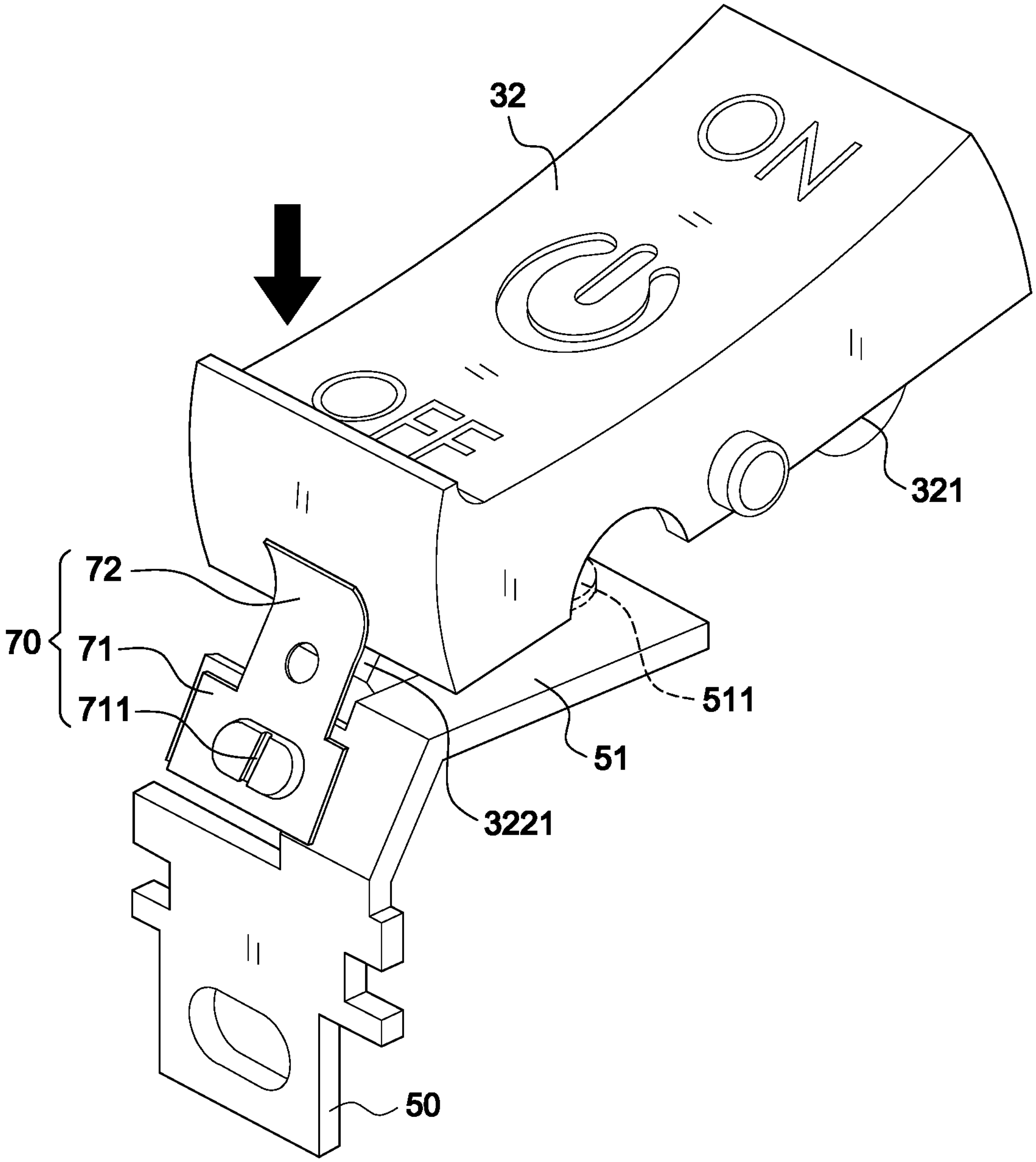
FIG. 5B is a perspective view of the elastic leaf and the seesaw lampshade when the elastic arc contact end is located at the inclined pressing surface.
Figure 6:
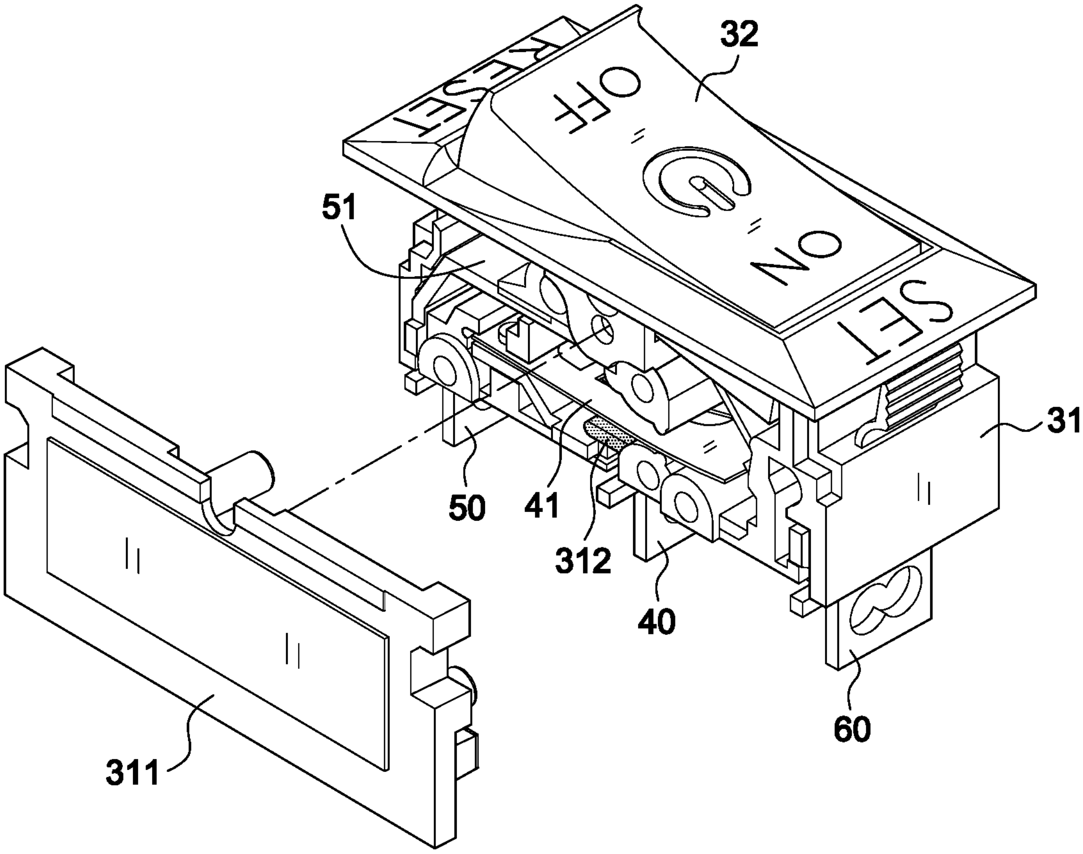
FIG. 6 is an exploded view of the housing and the side cover of the present invention.
Figure 7:
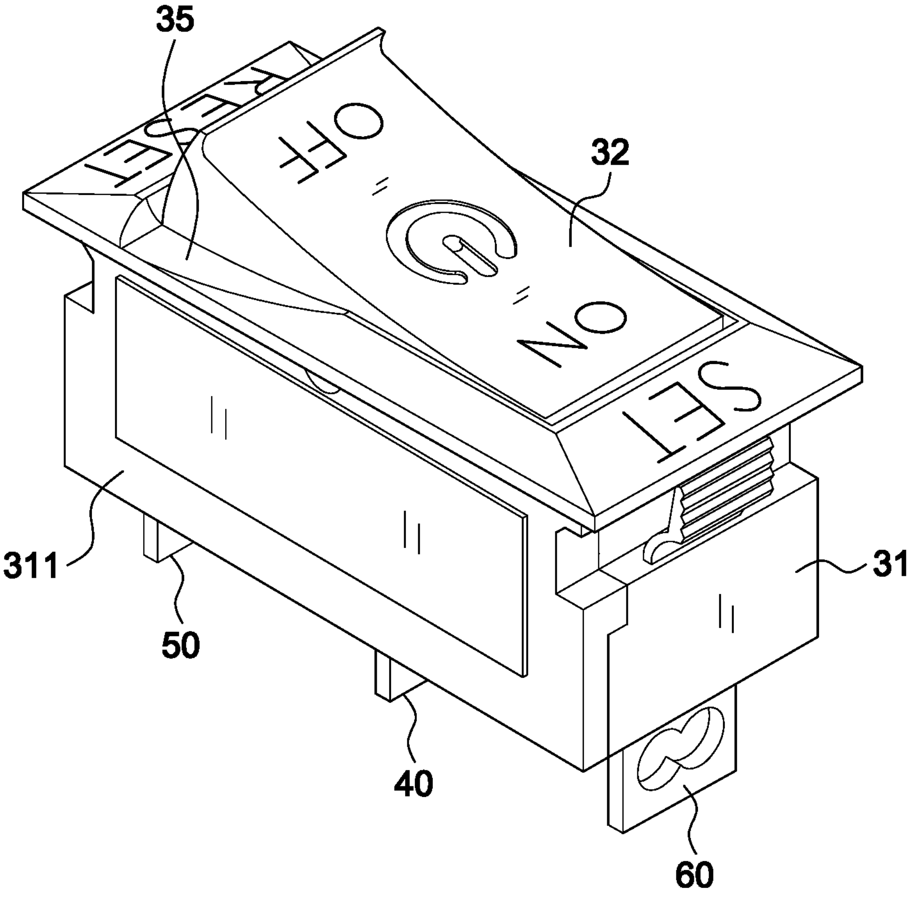
FIG. 7 is a perspective view of the preferred embodiment of the present invention.

As FIGS. 5A and 5B showing, the seesaw lampshade 32 is provided with a protruding block 322A at the other end corresponding to the pivot hole 321, the protruding block 322A is formed by extending downward from the outside of the seesaw lampshade 32, having an inclined pressing surface 3221 at the upper part and an inclined against surface 3222 at the lower part.

An elastic leaf 70 arranged above the second terminal 50 and contacting the outside of the protruding block 322A for providing the seesaw lampshade 32 with an elastic stopping force, whereby when switched to the ON position, the elastic leaf 70 is located on the inclined against surface 3222 at the lower part of the protruding block 322A; when switched to the OFF position, the elastic leaf 70 is located on the inclined pressing surface 3221 of the protruding block 322A, ensuring that the seesaw lampshade 32 and the moving rod 33 are accurately positioned in the housing 31, thereby pushing the brake plates 332 at the bottom end of the moving rod 33 upward, causing the movable end 411 of the binary alloy conductive plate 41 pulled upwardly to the highest point and thereby cause the spring leaf 42 to bounce downwardly to the vibration reduction plate 312 position, then the distance between the first connecting point 421 and the second connecting point 511 is maximized (Dmax) to ensure the safety of the insulation distance between the two connecting points.

FIG. 5A is a perspective view of the elastic leaf 70 and the seesaw lampshade 32, showing that the elastic arc contact end 72 is located outside the inclined against surface 3222. FIG. 5B shows that the elastic arc contact end 72 is located above the inclined against surface 3222. In this embodiment, the elastic leaf 70 includes a main body 71 and an elastic arc contact end 72 located above the main body 71, the elastic leaf 70 is fixed on the second terminal 50 by riveting method 711, but it is not limited to this. That is to say, the elastic leaf 70 can also be fixed with a positioning unit or an embed slot (not showing in the drawing) in the housing 31.

Figure 8A:
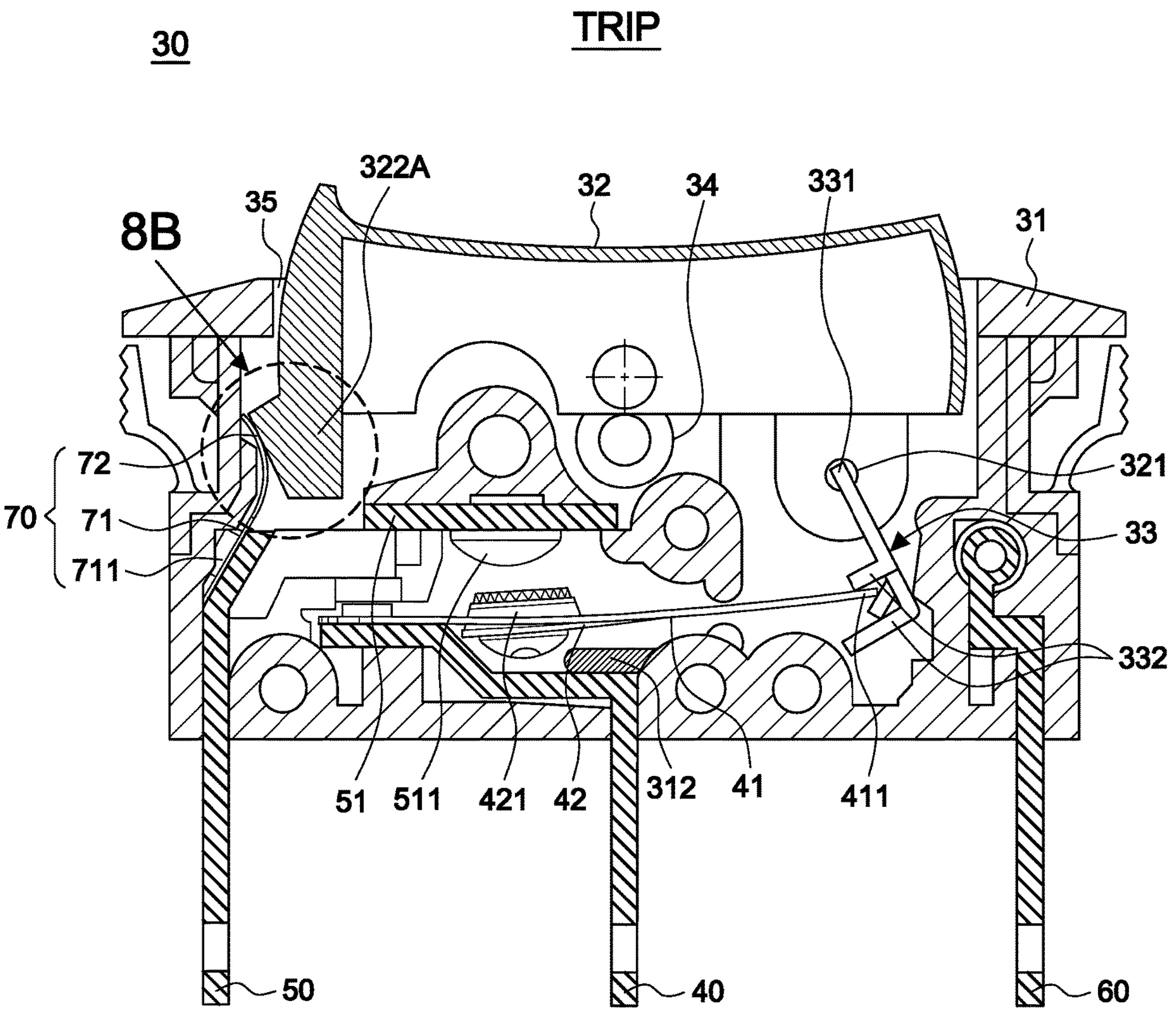
FIG. 8A is a sectional view of the preferred embodiment of the present invention, when is in TRIP status.
Figure 8B:
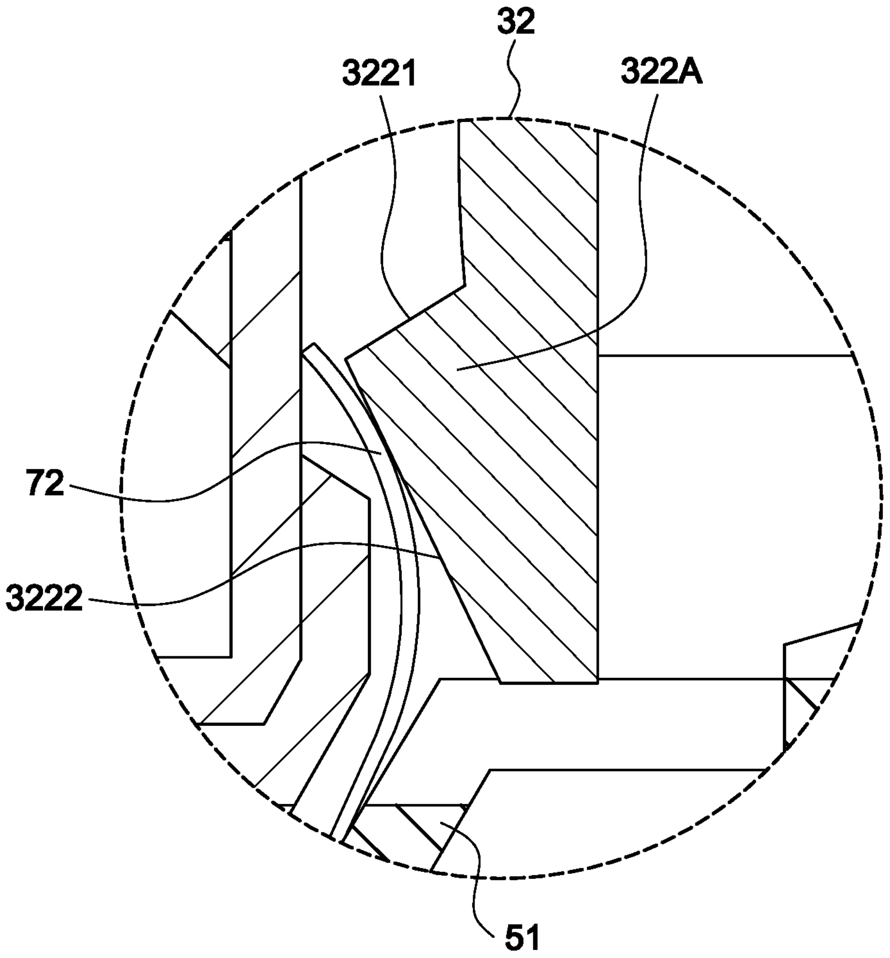
FIG. 8B is a zoom in view of the 8B area in FIG. 8A.

With the structure above mentioned, referring to FIGS. 8A and 8B, which show that the circuit breaker 30 is in a TRIP state; At this time, the elastic arc contact end 72 of the elastic leaf 70 is located on the inclined against surface 3222 of the lower part of the protruding block 322A and is close to the "peak" position.

Referring to FIG. 9, which show that the circuit breaker 30 is in a ON state; At this time, the right side of the seesaw lampshade 32 is pressed, and the protruding block 322A rises up; At this time, the elastic arc contact end 72 of the elastic leaf 70 is located below the inclined against surface 3222 which is at the "downhill" position of the lower edge of the protruding block 322A, and the upward pushing elastic force of the protruding block 322A can ensure that the seesaw lampshade 32 is at the ON terminal position.

Referring to FIG. 10, which show that the circuit breaker 30 is in a OFF state; At this time, the left side of the seesaw lampshade 32 is pressed, and the elastic arc contact end 72 of the elastic leaf 70 is located at the upper edge of the inclined pressing surface 3221 of the outside upper edge of the protruding block 322A which is located at the "valley" position of the protruding block 322A, and the downward pressing elastic force of the protruding block 322A can ensure that the seesaw lampshade 32 is at the OFF terminal position.

Figure 11A:
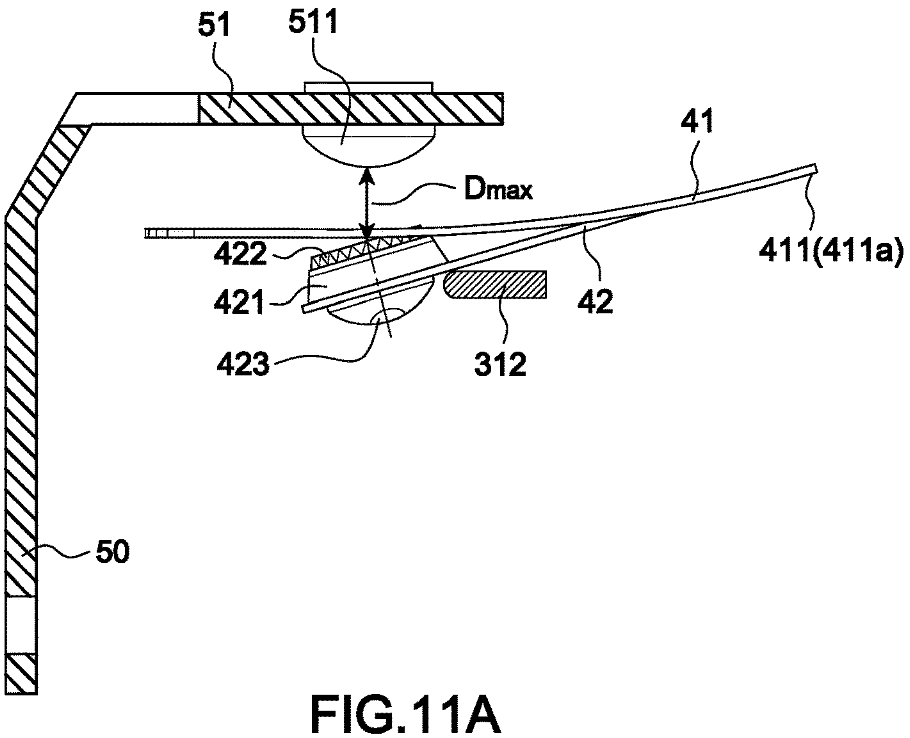
FIG. 11A is a side view of the present invention when the first connecting point and the second connecting point are separated.
Figure 11B:
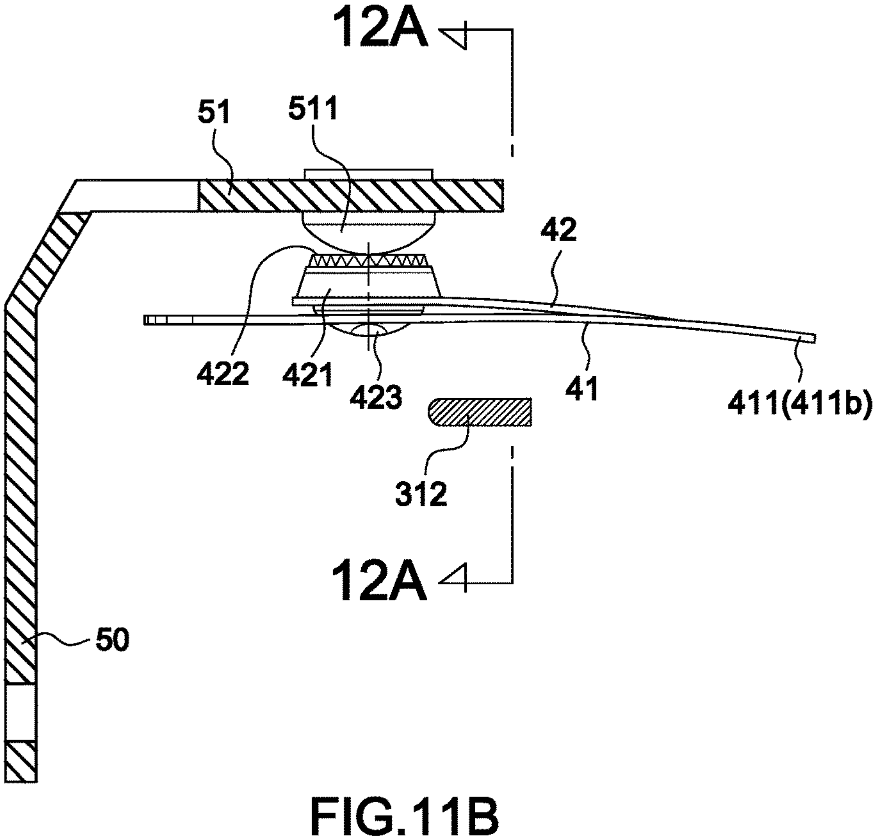
FIG. 11B is a side view of the present invention when the first connecting point and the second connecting point are contacted.

Also, FIG. 11A is the side view showing the first connecting point 421 and the second connecting point 511 during separation, when the spring leaf 42 bounce downwardly and deformed, the spring leaf 42 will be stopped by the vibration reduction plate 312, so it will not bounce downward further, and make the distance between the first connecting point 421 and the second connecting point 511 is maximized (Dmax) to ensure the safety of the insulation distance between the two connecting points.

Triangular and spring components can be used to change the operating stroke to a bidirectional three-stage control like MCCB and increase the insulation distance between the two contacts from 110V (1.6 mm) to the specified insulation distance of 220V (2.4 mm), within the same volume as the previously patented miniature switch MCB.

Figure 4C:
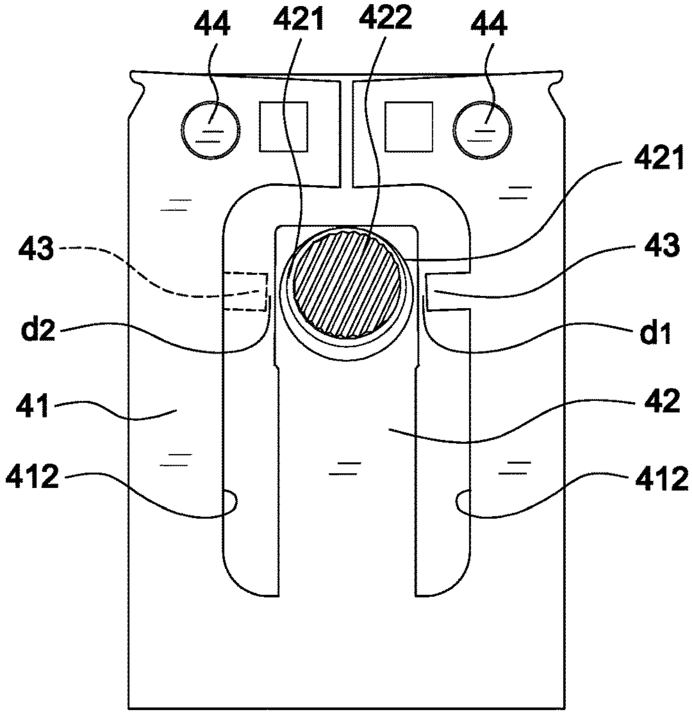
FIG. 4C is a schematic diagram illustrating the binary alloy conductive plate and the spring leaf of the present invention.

Referring to FIGS. 4*b* and 4C, which showing the structure of the binary alloy conductive plate 41 and the spring leaf 42, wherein the spring leaf 42 is formed at the movable end 411 of the binary alloy conductive plate 41 and extends from the inner side thereof, and form an equidistant space between the left and right inner side 412 of the binary alloy conductive plate 41, so that when the current is overloaded, the spring leaf 42 can smoothly bounce and deform on the binary alloy conductive plate 41, and the first connecting point 421 is arranged on the tail end of the spring leaf 42, and its contact surface is set in a non-planar shape and has a plurality of grooves 422; furthermore, at the position relative to the first connecting point 421 in the left and right inner sides 412 of the binary alloy conductive plate 41, at least one of the inner sides is provided with a lead 43 facing the first connecting point 421, and the inner end of the lead 43 is in a state of being close to but not in contact with the spring leaf 42, thereby forming an end receiving the electric arc (E) generated by the first connecting point 421 for making the electric arc (E) leave through the absorption channel formed by the closest lead 43. In this embodiment, the lead 43 is arranged at the right side, but not limit to this, it can be arranged at the left side, as dotted line showing.

In this embodiment, the equidistant space between the left and right inner side 412 of the binary alloy conductive plate 41 and the spring leaf 42 is greater than the distance between the inner end of the lead 43 and the spring leaf 42, so that the electric arc (E) generated by the first connecting point 421 is received by the lead 43 due to the distance changes.

Figure 12A:
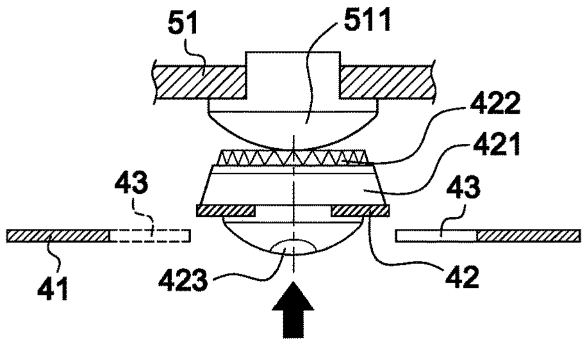
FIG. 12A is a schematic diagram illustrating the electric arc of the present invention when the first connecting point and the second connecting point are contacted.

Referring to the FIGS. 12A-12D, which illustrating the change of the electric arc (E) of the present invention when the first connecting point 421 and the second connecting point 511 are contacted or separated; wherein the FIG. 12A shows the first connecting point 421 and the second connecting point 511, when the electric arc (E) is not formed yet. The so-called "electric arc" is a form of electric discharge in gases. Electric discharge in gases is divided into two categories: self-sustaining discharge and non-self-sustaining discharge. Electric arc belongs to arc discharge in gas self-sustaining discharge. Tests have proven that when a circuit with a voltage exceeding 10V and a current exceeding 0.5 A is opened or closed in the atmosphere, a ball of extremely high temperature, extremely bright and capable energy will be generated in the gap between the two contact points. A gas that conducts electricity is called an electric arc. Due to the high temperature and strong light of the electric arc, it can be widely used in welding, smelting, chemical synthesis, strong light sources and space technology. For electrical appliances with contact points, since electric arcs are mainly generated when the contact points disconnect the circuit, the high temperature will burn the contact points and insulation. In serious cases, it may even cause phase short circuits and electrical appliance explosions, thus causing fires and endangering the safety of personnel and equipment. Therefore, the design of the present invention is to guide the electric arc generated when the first connecting point 421 and the second connecting point 511 are separated.

Figure 12B:
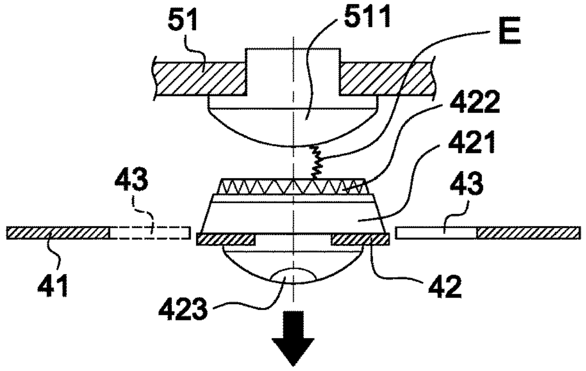
FIG. 12B is a schematic diagram illustrating the electric arc of the present invention when the first connecting point and the second connecting point are just separated.
Figure 12C:
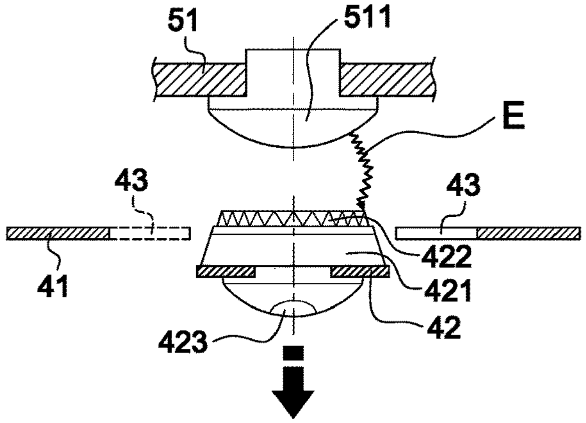
FIG. 12C is a schematic diagram illustrating the stretching of the electric arc of the present invention.
Figure 12D:
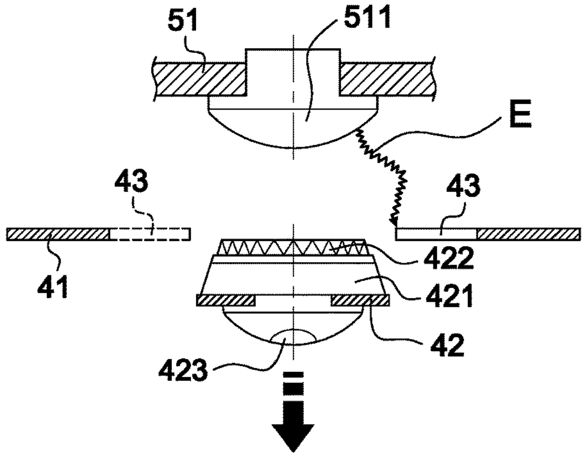
FIG. 12D is a schematic diagram illustrating the leaving of the electric arc of the present invention.

FIG. 12B shows a schematic diagram of the change of the electric arc (E) when the first connecting point 421 and the second connecting point 511 are just separated; At this time, the electric arc (E) starts to be generated between the first connecting point 421 and the second connecting point 511. FIG. 12C shows a schematic diagram of the electric arc (E) changing when the distance between the first connecting point 421 and the second connecting point 511 is extended; At this time, the electric arc (E) is stretched and looking for the nearest current channel FIG. 12D shows a schematic diagram of the downward displacement of the first connecting point 421; At this time, the large current and high temperature electric arc (E) generated by it is closer to the lead 43 due to the displacement, so the electric arc (E) can be continuously guided and leave through the lead 43. When the electric arc (E) is instantly transferred to the lead 43, the electric arc (E) between the original two connecting points (421, 511) disappears, and the current conduction function is no longer available, which can prevent the binary alloy conductive plate 41 from thermal damage caused by continuous heating and continuous electric arc (E) damage to the first connecting point 421 and the second connecting point 511.

Figure 13A:
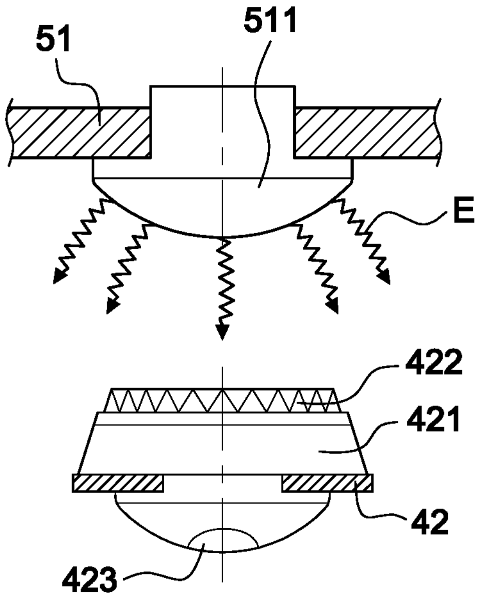
FIG. 13A is a schematic diagram illustrating the electric arc if without the guiding of the lead of the present invention.

Therefore, it is clearly shown in FIGS. 12A to 12D that if there is no arrangement of the lead 43 to guide the electric arc (E) away, the electric arc (E) will be generated as shown in FIG. 13A. The electric arc (E) cannot disappear on its own, since it cannot be received and guided, it will scatter in all directions to form a diffuse carbon ash layer, which will affect the dielectric test results and affect the bending characteristics of the binary alloy conductive plate 41 due to continuous heating and further causes the trip curve to drop.

Figure 14A:
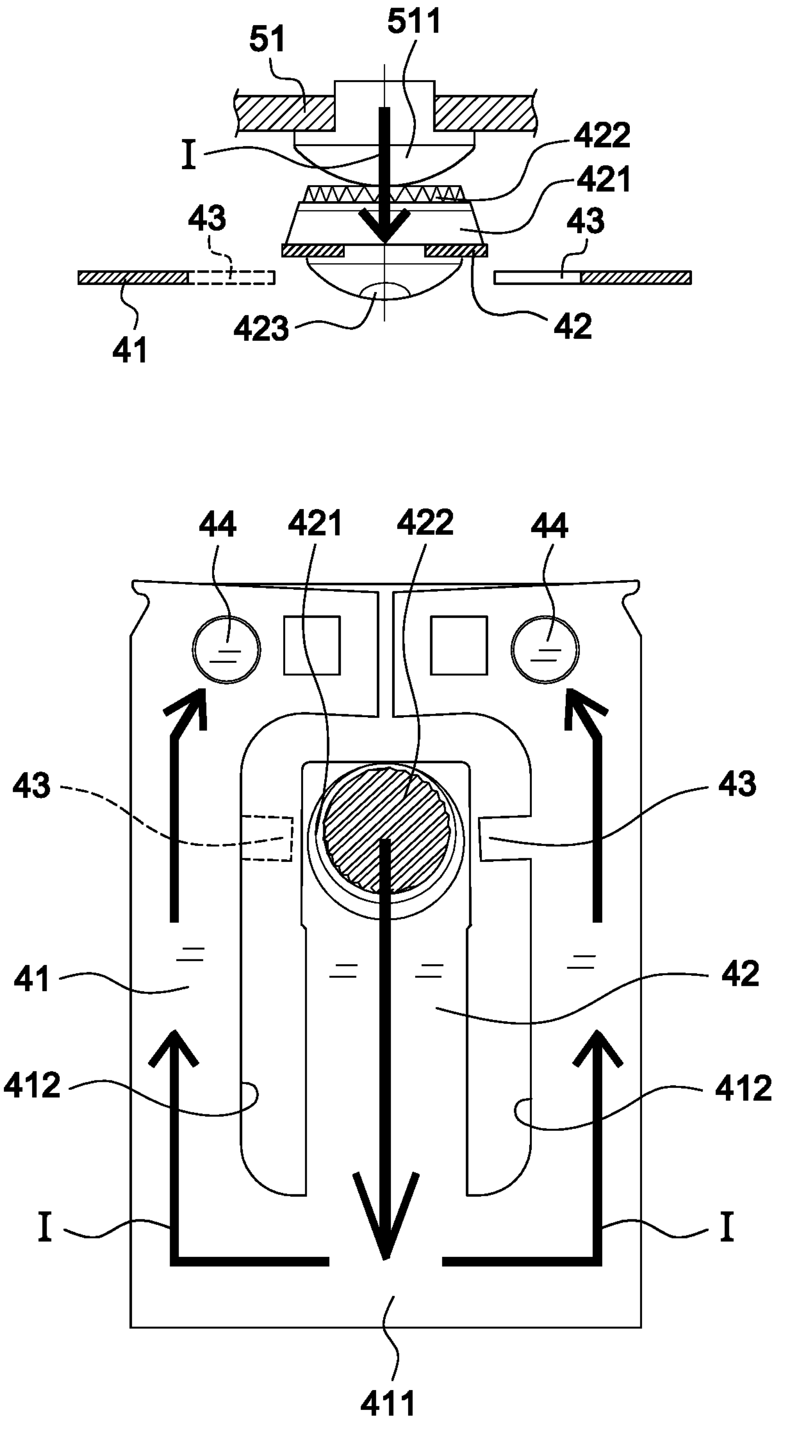
FIG. 14A is a schematic diagram illustrating the electric flow without generating the electric arc of the present invention when the first connecting point and the second connecting point are just contacted.

Referring to FIG. 14A, which shows a schematic diagram of the current (I) flow without generating the electric arc (E) when the first connecting point 421 and the second connecting point 511 are just in contact (as showing in FIG. 12A); at this time, the current (I) flow to the second connecting point 511→the first connecting point 421→the spring leaf 42→the movable end 411 of the binary alloy conductive plate 41→bidirectional rotation→both sides of the binary alloy conductive plate 41→two riveted points 44.

Figure 14B:
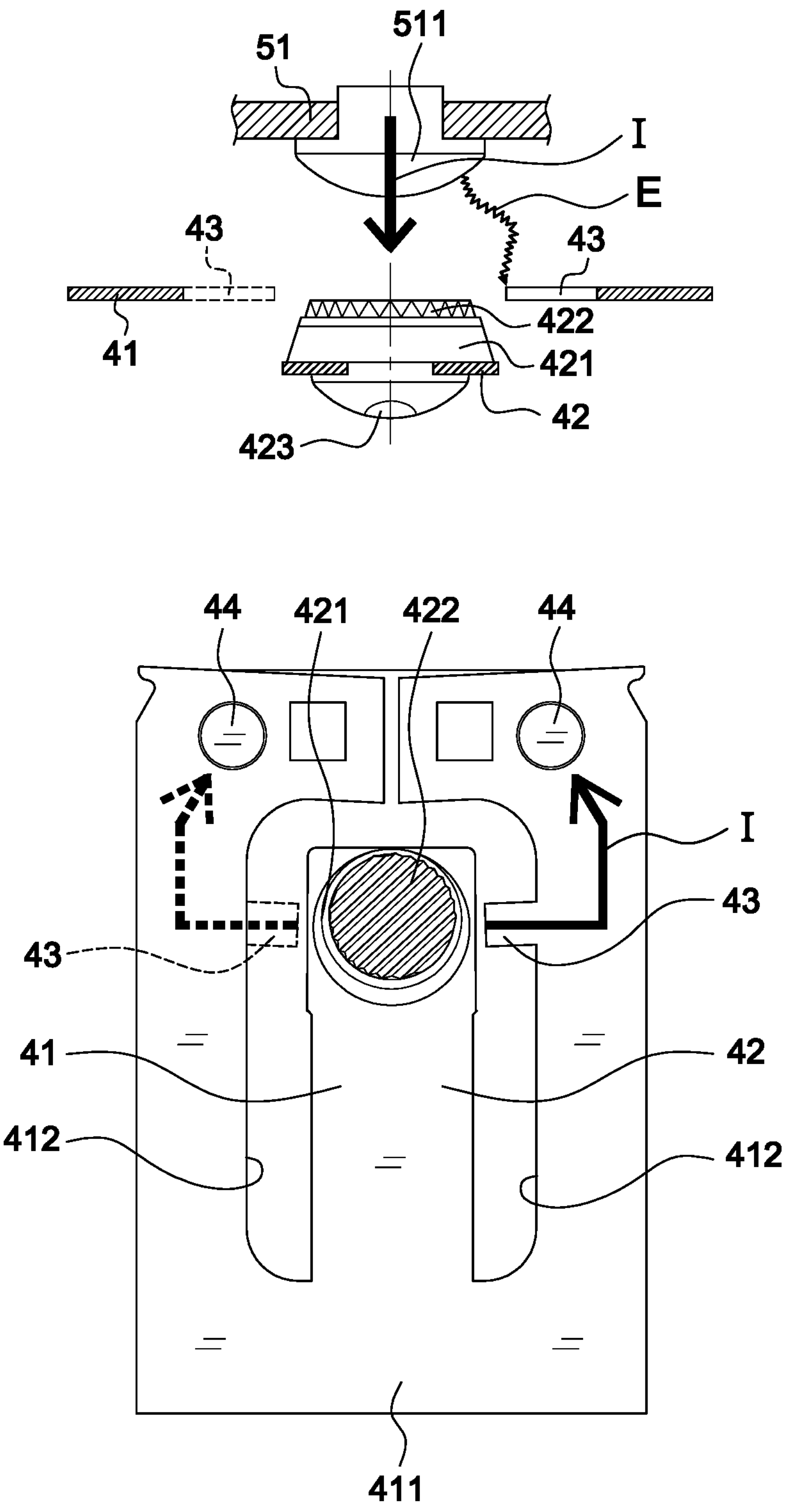
FIG. 14B is a schematic diagram illustrating the electric flow of the present invention when the first connecting point and the second connecting point are separated.

Referring to FIG. 14B, which shows a schematic diagram of the current (I) flow when the first connecting point 421 and the second connecting point 511 are separated (as showing in FIG. 12A); At this time, the electric arc (E) is closer to the lead 43, so the electric arc (E) can be continuously guided to the lead 43 to leave. In other words, when the electric arc (E) reaches the arc breaking distance during separation, the emitted electric arc (E) can smoothly leave through the nearest lead 43 channel, and will not explode and scatter in all directions. That is to say, when the electric arc (E) is instantly transferred to the lead 43, the original electric arc (E) of the first connecting point 421 and the second connecting point 511 is guided to the riveted point 44 to avoid the first connecting point 421 and the second connecting point 511 be damaged by the electric arc (E), and the condensed area of the binary alloy conductive plate 41 no longer has the function of current conduction, so that the binary alloy conductive plate 41 is not subject to stress decay caused by high temperature in short circuits, which can significantly reduce losses and enable it to pass the lossless short-circuit test.

Furthermore, the present invention uses the relative movement of movable connecting point and the lead 43 of the fixed position on the binary alloy conductive plate 41 to guide the electric arc (E). Therefore, there is no need to change the original connecting point separation structure, in addition to maintaining the required insulation distance, and not affect the continuity characteristics of electric arc deflection.

Figure 13B:
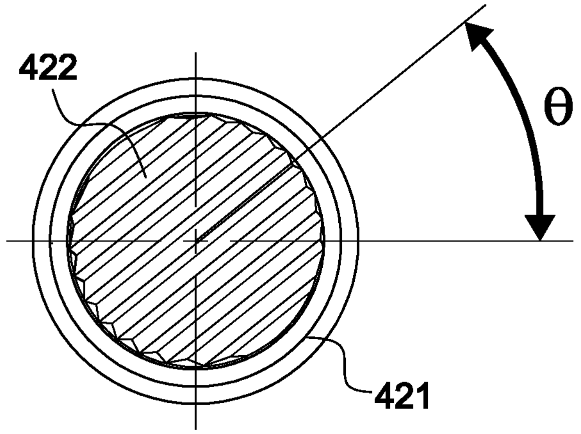
FIG. 13B is a stop view of the second connecting point of the present invention.

Referring to FIG. 13B, the contact surface of the first connecting point 421 is set in a non-planar shape and has a plurality of grooves 422; in this embodiment, the space between each grooves is 0.2 mm~0.5 mm and presents an oblique surface with a rotational offset angle (θ); in this embodiment, the rotational offset angle (θ) is 20 to 50 degrees, but not limit to this.

The arrangement grooves 422 can guide the removal of a large amount of environmentally friendly carbon ash generated during a short circuit, which is conducive to using environmentally friendly materials for the first connecting point 421 and the second connecting point 511, because non-environmentally friendly silver-cadmium materials volatilize at high temperatures and do not contain carbon ash problem.

Therefore, in this embodiment, the flow characteristics of the melted silver layer are used so that the new carbon ash can temporarily fall into the inclined arrangement grooves 422, and when the next short circuit touches the silver layer, the melting silver and repelling cause the carbon ash flowing smoothly in the direction of the bevel and does not affect the conductivity between the silver points during subsequent operations.

In the embodiment, the surface of the housing 31 at the OFF end is provided with a concave arc surface 35 for the user to conveniently press the seesaw lampshade 32 downward to the RESET position.

With the above-mentioned features, the present invention has the following effects that need further clarify:

1. Furthermore, the protruding block 322A of the seesaw lampshade 32 is provided with the inclined pressing surface 3221 and the inclined against surface 3222 which formed on the both sides of the triangular-shaped protruding block to provide the elastic clamping force of the seesaw lampshade 32, so that when the seesaw lampshade 32 is switched to OFF, the elastic arc contact end 72 of the elastic leaf 70 is located at the upper edge of the inclined pressing surface 3221 of the outside upper edge of the protruding block 322A which is located at the "valley" position of the protruding block 322A; when the seesaw lampshade 32 is switched to ON, the elastic arc contact end 72 of the elastic leaf 70 is located at the inclined against surface 3222 below the protruding block 322A which is located at the "downhill" position of the protruding block 322A; thereby ensuring that the seesaw lampshade 32 and the moving rod 33 are accurately positioned in the housing.
2. Using a vibration reduction plate 312 the side cover 311 or the inner edge of the housing 31 arranged perpendicular to the lower part of the binary alloy conductive plate 41, so that when the binary alloy conductive plate 41 forms an open circuit (OFF), the vibration reduction plate 312 can prevent the spring leaf 42 from excessive bounce deformation and suppressing vibration, and further increase service life.
3. The present invention does not need to change the structure of the original contact separation structure, the inner end of the lead 43 is close to but not in contact with the spring leaf 42, so that the electric arc (E) is leaved from the closest absorption channel formed by the lead 43, the original electric arc (E) between the two connecting points disappears, and there is no current conduction function, and there is no continuous electric arc (E) to damage the first connecting point 421, the second connecting point 511 and the binary alloy conductive plate 41. Therefore, it is a device that change the conductive position to smoothly discharge the current to eliminate the electric arc, which can shorten the occurrence time and distance of the electric arc to reduce the loss of the silver point and the binary alloy conductive plate to achieve the purpose of short circuit without loss.
4. The arrangement grooves 422 on the first connecting point 421 makes the first connecting point 421 and the second connecting point 511 can be applied as environmentally friendly materials, and can eliminate the carbon ash.
5. The present invention improves the two-stage switching operation of the miniature switch into a three-stage switching operation with bidirectional positioning, and further eliminates the need to add electromagnetic components without increasing the volume, and uses elastic force to eliminate the carbon ash structure; adding an original electric arc discharge device that having the arc remove ability to significantly reduce the electric arc (E) occurrence time and avoid the thermal damage of the binary alloy conductive plate 41, and improve the dielectric strength and voltage withstand characteristics after three short circuits; and the recalibration can exceed the highest level U3 level of Short-Circuit Test, and the calibration curve after three short circuits achieve 100% lossless characteristics.
6. Since the surface of the contact point that is burned during a short circuit will cause loose contact due to the uneven surface, which will affect the short circuit protection level and the number of short circuits, the present invention uses the spring leaf 42 to push away the carbon ash, and uses the cone-shaped contacts on the positioning member to clean the carbon deposits in the plurality of grooves on the movable units in layers and in batches to ensure that the surface remains flat without dents after a short circuit and can continue to be used.
7. Through the above two technical means, the operating quality of the previous U.S. Pat. No. 11,501,941 "Overload protection switch with reverse restart switching structure" has been improved, and the service life, reliability and safety of the overload protection switch have been further improved.

Although particular embodiments of the invention have been described in detail for purposes of illustration, various modifications and enhancements may be made without departing from the spirit and scope of the invention. Accordingly, the invention is not limited except as by the appended claims.

What is claimed is:

1. A trip overload protection switch with reverse restart switching structure, comprising:

a housing, having a top opening and a side opening, the top opening has a seesaw lampshade, and a first terminal and a second terminal arranged at a bottom section; the first terminal is connected to a binary alloy conductive plate, the binary alloy conductive plate has a spring leaf with a first connecting point, and the second terminal has a second connecting point on a surface of an upper section thereof disposed in correspondence with the first connecting point;

a moving rod linking a pivot hole at a bottom of the seesaw lampshade with one end and the binary alloy conductive plate with an opposing end thereof for the first connecting point to contact the second connecting point responsive to the pivot hole being pushed inward, to thereby achieve a conducting state (ON), and the first connecting point disconnecting from the second connecting point responsive to occurrence of a current overload wherein the binary alloy conductive plate deforms due to high temperature, and thereby achieving a nonconducting state (OFF), to thereby form an overcurrent protection switch; wherein:

the seesaw lampshade is provided with a protruding block at the opposing end corresponding to the pivot hole, the protruding block is formed by extending downward from an outside of the seesaw lampshade, having an inclined pressing surface at an upper part and an inclined against surface at a lower part; and an elastic leaf arranged above the second terminal and contacting an outside of the protruding block for providing the seesaw lampshade with an elastic stopping force, whereby when switched to an ON position, the elastic leaf is located on the inclined against surface at the lower part of the protruding block; when switched to an OFF position, the elastic leaf is located on the inclined pressing surface of the protruding block, ensuring that the seesaw lampshade and the moving rod are accurately positioned in the housing, thereby pushing a bottom end of the moving rod upward, causing a movable end of the binary alloy conductive plate be pulled upwardly to a highest point and thereby cause the spring leaf to bounce downward, then a distance between the first connecting point and the second connecting point is maximized and not affected by a hairline crack of the binary alloy conductive plate to ensure the safety of an insulation distance between the two connecting points.

2. The overload protection switch with a reverse restart switching structure as claimed in claim 1, wherein the elastic leaf includes a main body and an elastic contact arc end over the main body.

3. The overload protection switch with a reverse restart switching structure as claimed in claim 1, the moving rod includes: a horizontal rod arranged at an upper section of the main body to set through the pivot hole of the seesaw lampshade; two brake plates which extended inward and pushed upward and downward are arranged at a lower section of the moving rod for linking an upward or downward movement of the movable end of the binary alloy conductive plate.

4. The overload protection switch with a reverse restart switching structure as claimed in claim 1, wherein the housing further includes a vibration reduction plate below the binary alloy conductive plate.

5. The overload protection switch with a reverse restart switching structure as claimed in claim 4, wherein the housing further includes a third terminal and a side cover for closing the side opening.

6. The overload protection switch with a reverse restart switching structure as claimed in claim 5, wherein the vibration reduction plate is provided on an inner edge surface of the side cover or in the housing, and is arranged vertically relatively to the bottom of the binary alloy conductive plate, so that when the binary alloy conductive plate bounces to the OFF position, the spring leaf is a stop against downward movement of the vibration reduction plate due to elastic stopping force, preventing excessive bounce deformation and suppressing vibration.

7. The overload protection switch with a reverse restart switching structure as claimed in claim 1, wherein the spring leaf is formed at the movable end of the binary alloy conductive plate and extends from an inner side thereof, and an equidistant space is formed between a left and right inner side of the binary alloy conductive plate, so that when the current is overloaded, the spring leaf smoothly bounces and deforms on the binary alloy conductive plate, and the first connecting point is arranged on a tail end of the spring leaf; furthermore, at a position relative to the first connecting point in the left and right inner sides of the binary alloy conductive plate, at least one of the inner sides is provided with a lead facing the first connecting point, and an inner end of the lead is in a state of being close to but not in contact with the spring leaf, thereby forming an end receiving an electric arc generated by the first connecting point for making the electric arc leave through an absorption channel formed by the closest lead.

8. The overload protection switch with a reverse restart switching structure as claimed in claim 7, the contact surface of the first connecting point is set in a non-planar shape and has a plurality of grooves, a space between each grooves is 0.2 mm~0.5 mm and presents an oblique surface with a rotational offset angle, the rotational offset angle is 20 to 50 degrees.

9. The overload protection switch with a reverse restart switching structure as claimed in claim 8, the first connecting point is riveted on the spring leaf, then using a small punch-pin to squeeze a rivet post once on the top of the semicircular rivet head to form a down concave arc surface that fills a perforation gap and avoid indirect conduction then directly conducts electricity with an inner copper sheet of the binary alloy conductive plate to enhance a stability of a combination and good conductivity, so as to speed up the deformation and tripping in the event of a short circuit.

* * * * *